United States Patent [19]
Giani et al.

[11] Patent Number: 5,529,390
[45] Date of Patent: Jun. 25, 1996

[54] MIXING MACHINE WITH SYMMETRICALLY-GUIDED PRESSER ROD ACTUATOR

[75] Inventors: Mauro M. Giani, Guanzate; Enrico Scotti, Bolladello, both of Italy

[73] Assignee: Pomini S.p.A., Castellanza, Italy

[21] Appl. No.: 401,563

[22] Filed: Mar. 9, 1995

[30] Foreign Application Priority Data

Mar. 22, 1994 [IT] Italy ................ MI94A0537

[51] Int. Cl.$^6$ .................. B29B 7/24; B01F 15/02
[52] U.S. Cl. ............................. 366/76.6; 366/76.7
[58] Field of Search .............. 366/69, 76.1, 76.6, 366/76.7, 76.8, 76.9, 76.91, 83–85, 97, 297–301; 425/204, 208, 209

[56] References Cited

U.S. PATENT DOCUMENTS

| | | | |
|---|---|---|---|
| 4,512,664 | 4/1985 | Oiwa | 366/76.7 |
| 4,830,506 | 5/1989 | Borzenski | 366/97 X |
| 4,877,328 | 10/1989 | Müller et al. | 366/76.7 |
| 4,953,984 | 9/1990 | Miyoshi | 366/76.7 X |
| 5,061,078 | 10/1991 | Yada | 366/76.7 X |

FOREIGN PATENT DOCUMENTS

| | | |
|---|---|---|
| 0272338 | 6/1988 | European Pat. Off. . |
| 271075 | 9/1927 | United Kingdom . |

*Primary Examiner*—Charles E. Cooley
*Attorney, Agent, or Firm*—Herbert Dubno

[57] ABSTRACT

An apparatus for actuating the rod of a presser element of a mixing machine of the internal type which has a lower mixing assembly and an upper structure for feeding of the material. At least one pair of guides are arranged opposite each other on the sides of the feed structure parallel to the longitudinal axes of the machine and in a symmetrical position with respect to the latter on the opposite sides of a transverse horizontal axis. At least one pair of cylinders are fixed to the guides and having their rods of their pistons connected to a cross-member travelling via wheels on the guides. The top end of the presser rod is hinged to the cross member. The rod also slides while being guided by a sealing group integral in the axial direction with the cover of the feed hopper and movable with respect to the latter in a horizontal plane so as to allow the oscillating movement of the rod with respect to the longitudinal axis of the machine.

5 Claims, 5 Drawing Sheets

MIXING MACHINE WITH SYMMETRICALLY-GUIDED PRESSER ROD ACTUATOR

FIELD OF THE INVENTION

The present invention relates to an apparatus with cylinders arranged opposite each other for actuating a pressing element for pressing a mixture in a chamber of a mixing machine of the internal type.

BACKGROUND OF THE INVENTION

In rubber and plastic processing technology, in order to obtain a mixture suitable for transformation into a finished or semi-finished product, use can be made of a mixing machine of the so-called internal mixer type, having a mixing chamber inside which two shaped rotors rotate about parallel axes so as to achieve microdispersion and homogenization of the various components of the batch being processed throughout its mass.

The material to be mixed is fed into the chamber via openings arranged on the sides of the machine in an elevated position with respect to the mixing chamber and leading into the latter via a duct arranged parallel to the vertical axis of the machine.

Once the material has been fed, it is kept pressed inside the chamber by means of a presser element which can be actuated in a direction parallel to the vertical axis of the machine and in both the raising direction and lowering direction so as to allow respectively opening and closing of the hatch of the opening for loading the material and compression of the latter during processing.

A choice for actuating the presser element is illustrated, for example, in with at least two hydraulic cylinders installed laterally with respect to the material loading well.

This mixer, however, has the drawback that hydraulic cylinders are connected to the bottom part of the machine structure to avoid increasing the vertical dimensions of the machine itself. Therefore, in the case of actuation by means of a single pair of cylinders, the latter must be symmetrically arranged along a diagonal of the quadrilateral, the vertices of which are formed by the guides of a cross-member connected to the top end of the support rod of the presser element. With this arrangement, which cannot be avoided since otherwise it would cause blocking of the lateral openings for feeding of the chemical components, it is difficult to obtain correct balancing of the cylinder action.

In addition, the actuating rod of the presser element is rigidly fixed to two upper and lower guides elements. Hence, the transverse forces generated by the mixing thrust are directly transmitted to the rod which, owing to the rigid connections, may undergo deformation preventing correct sliding thereof.

OBJECT OF THE INVENTION

The object of the invention is to provide an apparatus for actuating a presser element for mixing machines of the internal type, which is able to perform a balanced movement of the presser support rod and absorb any transverse forces generated by the mixture such that these forces do not give rise to lateral thrusts on the rod itself and, moreover, such that the maximum force applied by the apparatus always corresponds to the downward stroke of the presser element and maintenance thereof in the operative position, namely in accordance with the actual need to apply a thrust which counterbalances the opposing thrust generated by the mixture being processed, even though the solution of these technical problems requires a greater extension of the overall vertical dimensions of the machine.

SUMMARY OF THE INVENTION

These results are obtained by the present invention which envisages an apparatus for actuating the rod of a presser element of mixing machines of the internal type, comprising a lower mixing assembly and an upper structure for feeding of the material and comprising at least one pair of guides arranged opposite each other on the sides of the feed structure parallel to the vertical axis of the machine and symmetrically with respect to the latter on the opposite sides of a horizontal axis, at least one pair of cylinders fixed to the guides and having the rod of the piston connected to a cross-member on which the top end of the rod is hinged and travelling via rolling means on said guides, said rod also sliding while being guided by a sealing group integral in the axial direction with the cover of the feed hopper and movable with respect to the latter in a horizontal plane so as to allow the oscillating movement of the rod with respect to the vertical axis of the machine.

According to the invention the top end of this rod is hinged to the cross-member via a ball-joint and the rod guiding and sealing group is coaxially inserted inside a seat of the hopper cover. This seat has internal dimensions greater than the external dimensions of the sealing group so as to allow movement thereof in a horizontal plane.

In a preferred embodiment of the apparatus according to the invention, the guides are symmetrically arranged on the sides of the hopper in a higher position with respect to the openings for feeding of the mixture additives and the cross-member travels on guides by means of wheels hinged on a flange integral with the cross-member.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
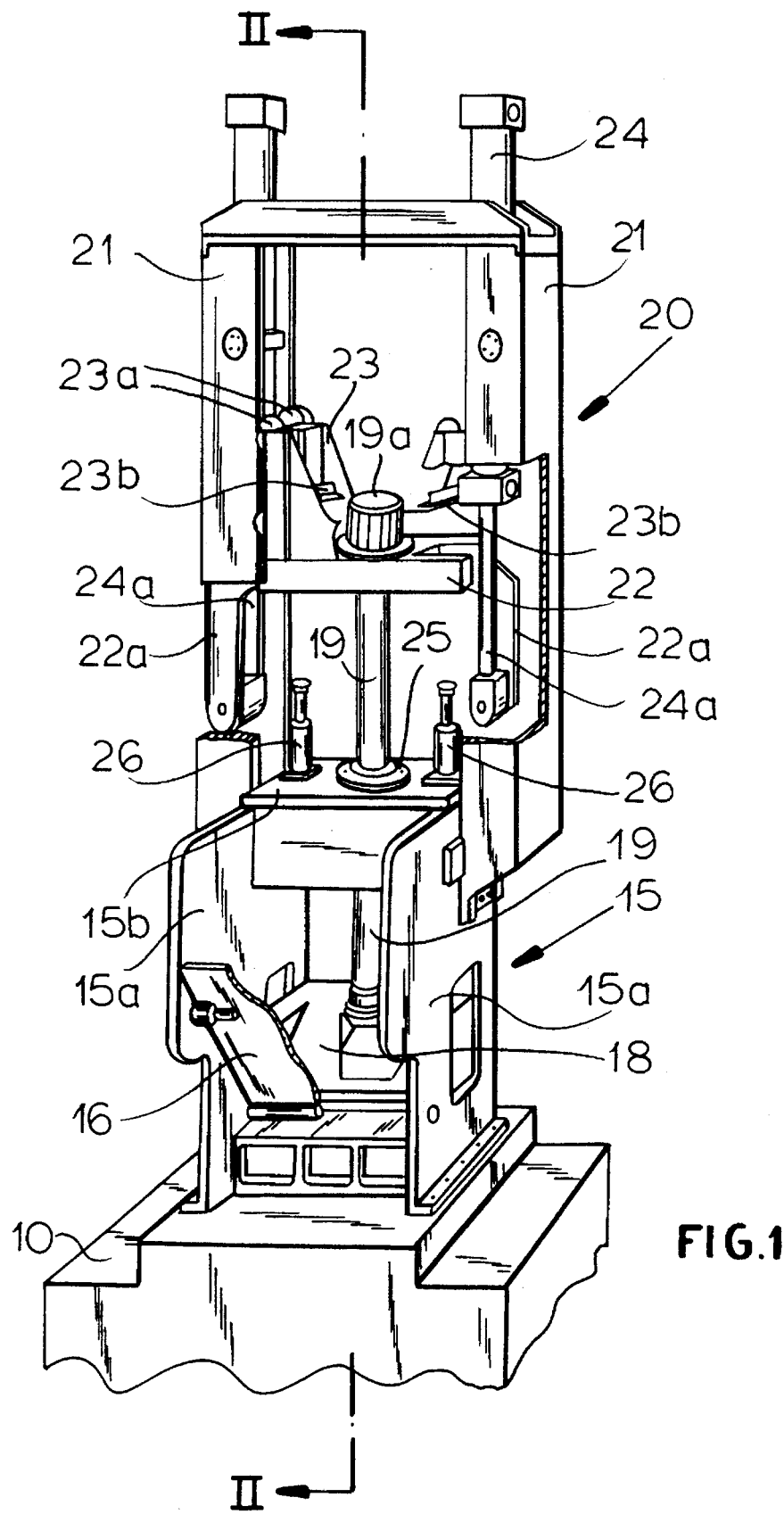
FIG. 1 is a perspective view, partly broken away, of the mixing machine with the apparatus for actuating the presser according to the present invention.

As shown in the drawing, the machine according to the invention comprises an assembly 10 having arranged inside it the internal chamber 11, the parallel rotors 12 and the bottom opening door 13 of the chamber 11 with associated locking and release device 14.

The assembly 10 also has rigidly connected to it the upper loading structure consisting of a hopper 15, between the lateral flanks 15a of which a hatch 16 (for introducing some ingredients of the batch) for opening and closing the material feed well is hinged, while other ingredients normally in the form of granular powders are fed through lateral openings 17a in the flanks 15a.

Figure 2:
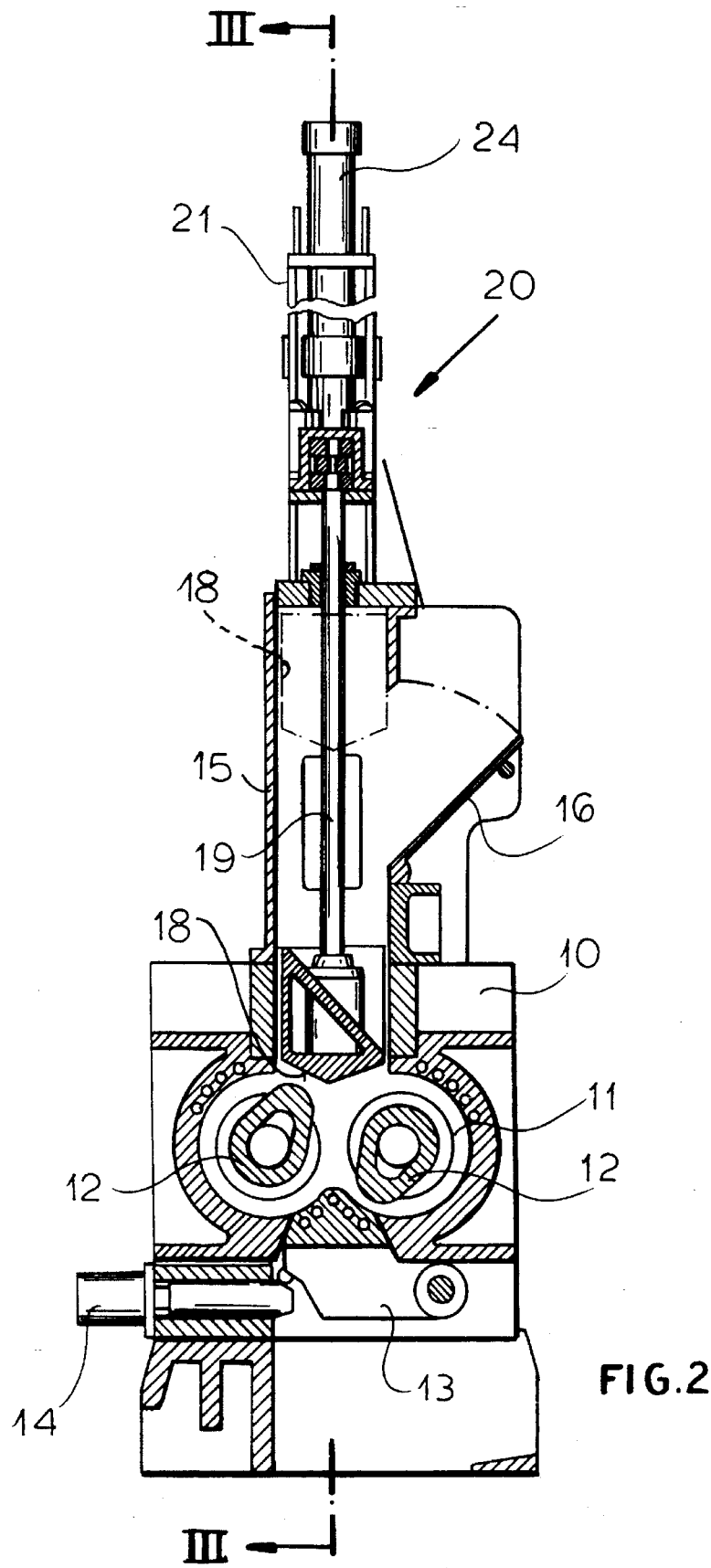
FIG. 2 is a section along the line II—II of FIG. 1.

The flanks 15a of the hopper 15 have rigidly connected to them the apparatus 20 for actuating the presser element 18 fixed to the bottom end of a vertical rod 19, both illustrated in FIGS. 1 and 2 with a continuous line in the lowered working position and with a broken line (FIG. 2) in the raised position for feeding of the material.

The actuating apparatus 20 comprises a pair of vertical guides 21 which are substantially "C" shaped and are arranged opposite each other on the flanks 15a of the hopper 15. A cross-member 22 travels on the longitudinal guides 21 by means of wheels 23a rotatable on flanges 23 integral with the upper surface of the cross-member 22.

The cross-member 22 also has a pair of fork elements 22a extending oppositely to the flanges 23 and connected to the free ends of the rods 24a of a respective piston of a cylinder 24 arranged inside each guide 21 and supported by the latter.

Figure 3:
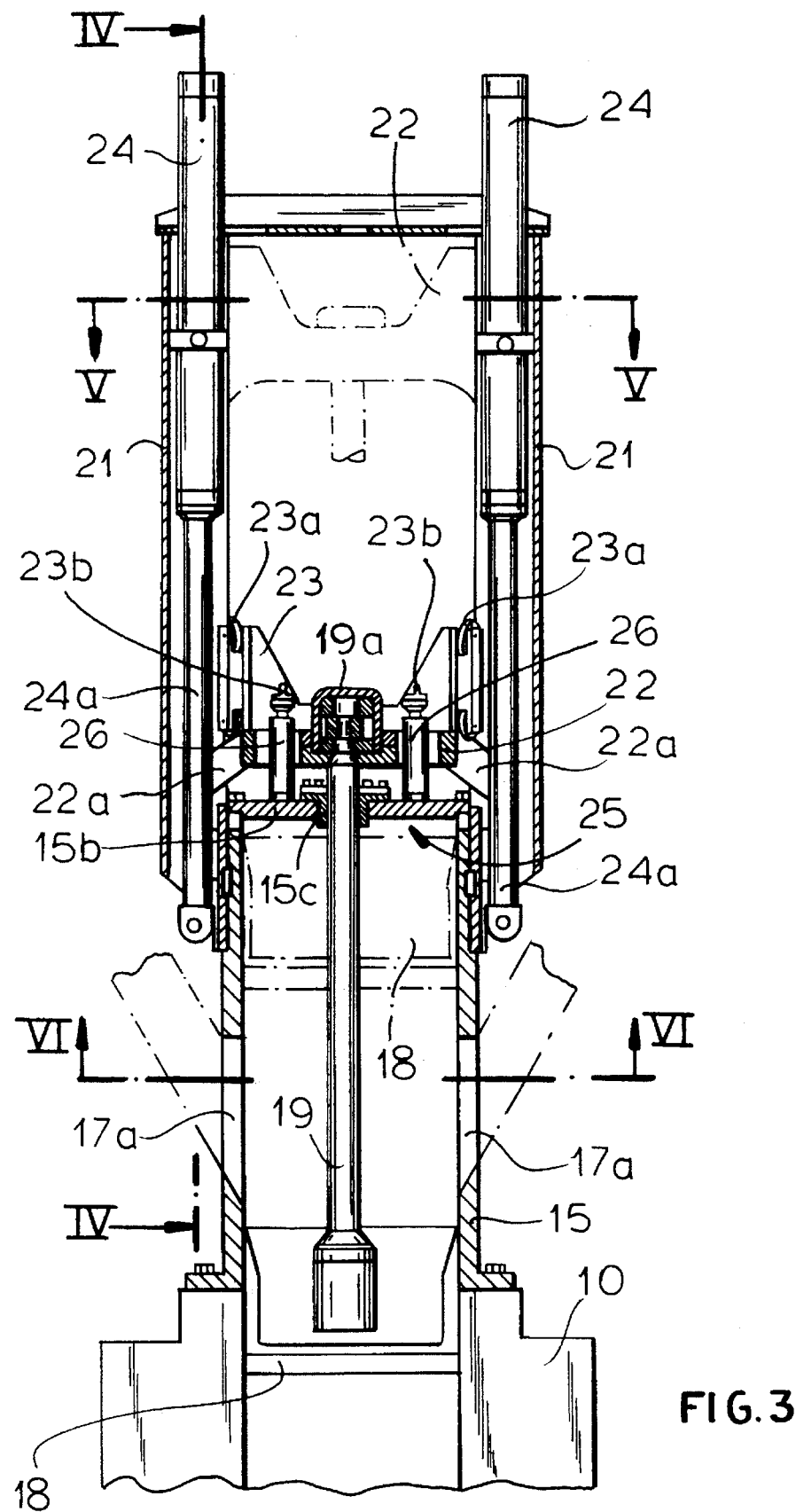
FIG. 3 is a vertical section along the line III—III of FIG. 2.
Figure 4:
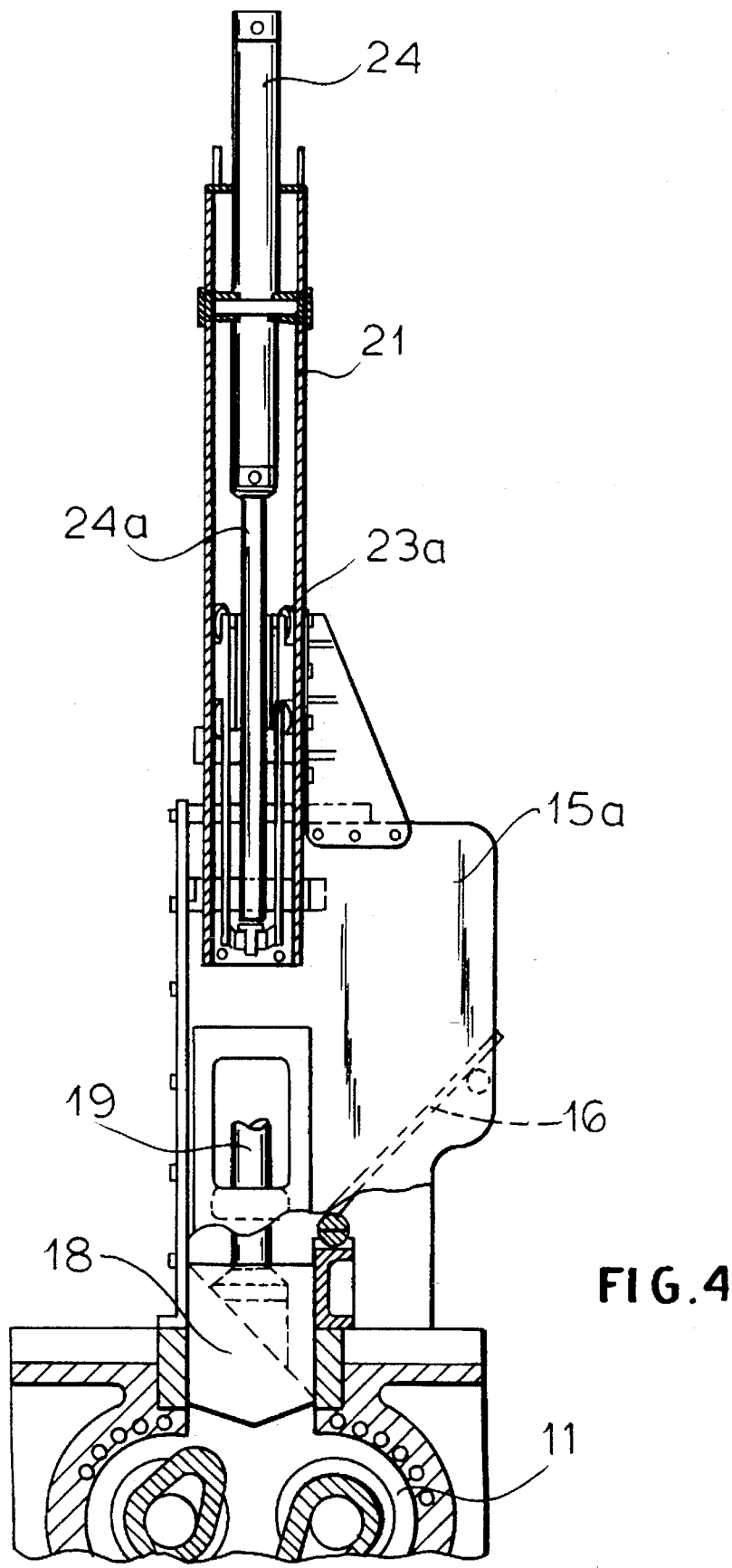
FIG. 4 is a vertical section along the line IV—IV of FIG. 3.
Figure 5:
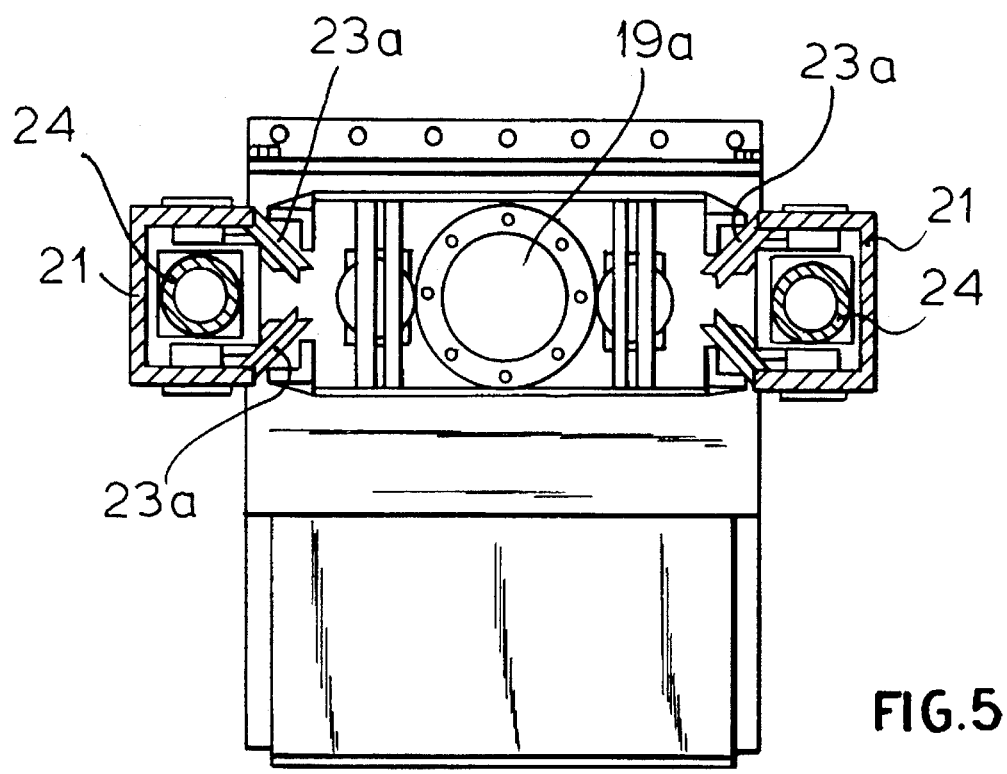
FIG. 5 is a horizontal section along the line V—V of FIG. 3.

As can be seen from FIG. 3, the top end of rod 19 is also connected to the cross-member 22 by means of a ball-joint 19a.

The rod 19 (FIGS. 1 and 3) is also guided by a sealing group 25 integral with the closing cover 15b of the loading hopper 15 of the mixer and translatable with respect to the latter in the transverse direction owing to the greater dimensions of the hole or seat 15c accomodating the sealing group 25, compared to the dimensions of the group itself.

Thus, the rod 19 is hinged at its top end, connected to the cross-member 22, via the ball-joint 19a and is free to oscillate with respect to the cover 15b of the loading hopper 15 owing to the play of the hole or seat 15c to absorb without flexing any transverse thrusts due to the forces exerted by the material during mixing.

The cover 15b of the mixer loading hopper also has associated with it two auxiliary cylinders 26 which are parallel to the vertical axis of the machine and the rods of which act on horizontal abutment bars 23b integral with the parts of flanges 23.

The auxiliary cylinders 26 are actuated when the presser 18 is raised so as to help the cylinders 24 overcome any resistance due to slight sticking which may occur between the presser and the walls of the mixing chamber as a result of infiltration of mixture particles between the two surfaces.

Figure 6:
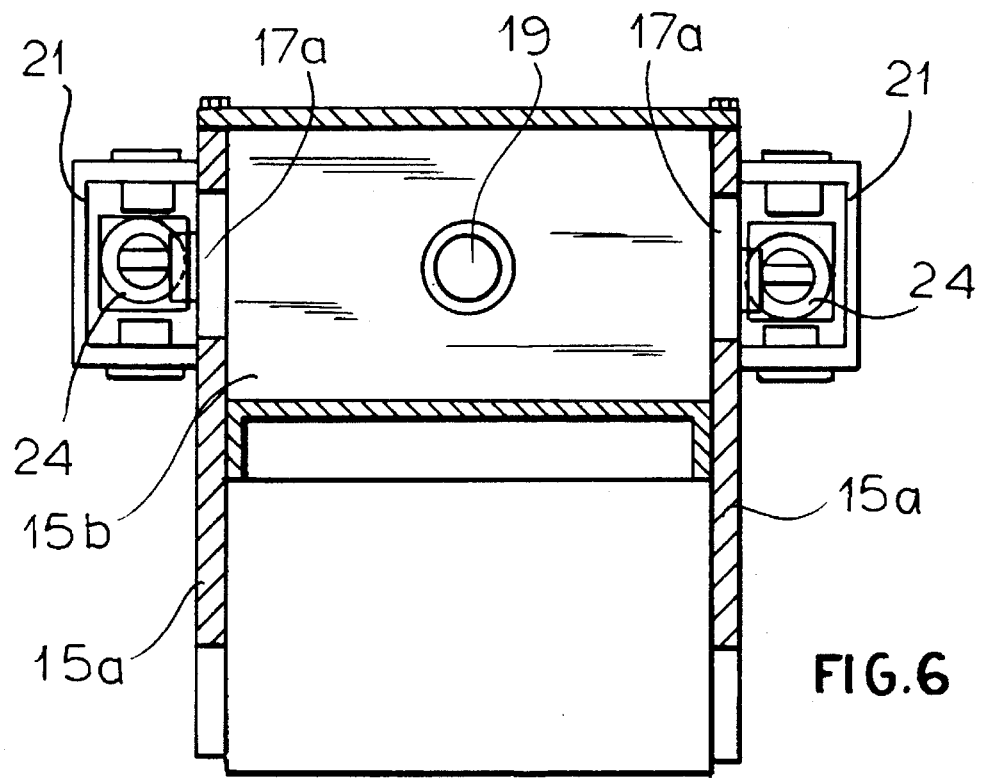
FIG. 6 is a horizontal section along the line VI—VI of FIG. 3.

As shown in FIGS. 1, 3, 5, and 6, with the apparatus according to the invention it is possible to position the cylinders 24 and the guides 21 well above the lateral openings 17a for feeding of the chemical ingredients, thereby making it possible to arrange the pair of cylinders on the sides of the hopper in an opposite and symmetrical position along an axis which is transverse with respect to the vertical axis of the machine, with the obvious advantage of balancing and a reduction in the possibility of jamming of the cross-member 22 during its travel movement (FIG. 6).

Moreover, owing to the arrangement of the cylinders 24 with the sliding rod 24a directed towards the base of the machine, the maximum area of the piston can be used, therefore resulting in the maximum thrust during the downward movement of the presser and in it being kept pressed against the mixture, therefore, during the required positive action. Any shortage of force for the return movement, a shortage which as already mentioned may occur during the first part of the return stroke upwards, is offset by the action of the auxiliary cylinders 26.

Many variants may be introduced as regards construction of the parts forming the invention, without thereby departing from the protective scope of the present invention as defined in the claims which follow.

We claim:

1. A mixer comprising:

a housing forming a mixing chamber provided with a mixing assembly for mixing a mixture of materials fed from above into said mixing chamber;

a feed structure extending upwardly from said mixing chamber for introducing said materials into said chamber, said housing and said feed structure having a vertical axis, said feed structure having a cover;

a pair of vertical guides disposed symmetrically on opposite sides of said vertical axis and affixed to said feed structure;

a respective cylinder affixed to each of said guides above said cover and having a respective piston rod extending out of a lower end of the respective cylinder;

a cross-member extending transversely to said axis above said cover and affixed at opposite ends to said piston rods below said cylinders for raising and lowering of said cross-member by said cylinders;

respective rolling means on each of said ends of said cross-member riding vertically on said guides;

a rod hinged at an upper end of said rod to said cross-member and extending downwardly therefrom through said cover into said feed structure;

a sealing assembly horizontally movable on said cover and vertically guiding said rod; and a presser member on a lower end of said rod adapted to extend into said chamber to apply pressure to the mixture therein, said presser member being retractable on said rod to enable said materials to be introduced into said chamber.

2. The mixer defined in claim 1 wherein said cover is provided with a seat for said assembly having greater internal dimensions than external dimensions of said assembly to enable movement of said assembly within said seat in a horizontal plane.

3. The mixer defined in claim 1 wherein said structure is formed with flanks having openings for feeding said materials into said structure, said guides being mounted on said flanks above said openings.

4. A mixer comprising:

a housing forming a mixing chamber provided with a mixing assembly for mixing a mixture of materials fed from above into said mixing chamber;

a feed structure extending upwardly from said mixing chamber for introducing said materials into said chamber, said housing and said feed structure having a vertical axis, said feed structure having a cover;

a pair of vertical guides disposed symmetrically on opposite sides of said vertical axis and affixed to said feed structure;

a respective cylinder affixed to each of said guides above said cover and having a respective piston rod extending out of a lower end of the respective cylinder;

a cross-member extending transversely to said axis above said cover and affixed at opposite ends to said piston rods below said cylinders for raising and lowering of said cross-member by said cylinders;

respective rolling means on each of said ends of said cross-member riding vertically on said guides;

a rod hinged by a ball joint at an upper end of said rod to said cross-member and extending downwardly therefrom through said cover into said feed structure;

a sealing assembly horizontally movable on said cover and vertically guiding said rod; and a presser member on a lower end of said rod adapted to extend into said chamber to apply pressure to the mixture therein, said presser member being retractable on said rod to enable said materials to be introduced into said chamber.

5. A mixer comprising:

a housing forming a mixing chamber provided with a mixing assembly for mixing a mixture of materials fed from above into said mixing chamber;

a feed structure extending upwardly from said mixing chamber for introducing said materials into said chamber, said housing and said feed structure having a vertical axis, said feed structure having a cover;

a pair of vertical guides disposed symmetrically on opposite sides of said vertical axis and affixed to said feed structure;

a respective cylinder affixed to each of said guides above said cover and having a respective piston rod extending out of a lower end of the respective cylinder;

a cross-member extending transversely to said axis above said cover and affixed at opposite ends to said piston rods below said cylinders for raising and lowering of said cross-member by said cylinders;

respective rolling means on each of said ends of said cross-member riding vertically on said guides, each of said rolling means including:

a respective pair of flanges at the respective end of said cross-member, and a plurality of wheels rotatable between the respective pair of flanges;

a rod hinged at an upper end of said rod to said cross-member and extending downwardly therefrom through said cover into said feed structure;

a sealing assembly horizontally movable on said cover and vertically guiding said rod; and a presser member on a lower end of said rod adapted to extend into said chamber to apply pressure to the mixture therein, said presser member being retractable on said rod to enable said materials to be introduced into said chamber.

\* \* \* \* \*